United States Patent Office 3,704,235
Patented Nov. 28, 1972

3,704,235
STABLE FREE RADICALS OF THE NITROXIDE TYPE DERIVED FROM TROPANE RING COMPOUNDS
Andre Rassat and Jacques Ronzaud, Grenoble, France, assignors to Commissariat a l'Energie Atomique, Paris, France
No Drawing. Filed Jan. 11, 1971, Ser. No. 105,627
Int. Cl. C07d 43/06
U.S. Cl. 260—292                                2 Claims

ABSTRACT OF THE DISCLOSURE

Free radicals of the nitroxide type constituted by nitrogenous bicyclic compounds having the general formula:

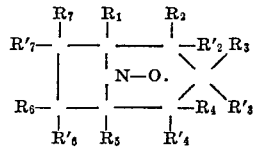

in which $R_1$, $R_2$, $R'_2$, $R_4$, $R'_4$, $R_5$, $R_6$, $R'_6$, $R_7$ and $R'_7$ are selected from the group formed by hydrogen atoms and organic radicals and $R_3$ and $R'_3$ are selected from the group formed by two hydrogen atoms, the groups OH, $NH_2$, N—OH, N—$NH_2$, —COOH, —COOH, —$CONH_2$ or constitute with the atom C of the ring the ketone group —C=O.

---

This invention is concerned with improvements to U.S. Pat. No. 3,494,390 in regard to stable free radicals of the nitroxide type which are characterized by good stability in spite of high chemical reactivity. These free radicals are nitrogenous bicyclic compounds in which one of the bridges is constituted solely by the nitroxide radical group.

The preparation of aza-9 bicyclo (3,3,1) nonanone-3-oxyl-9 and aza-9 bicyclo (3,3,1) nonane oxyl-9 was more particularly described in the above-cited patent.

The present invention relates to stable free radicals of the nitroxide type which belong to the series of alkaloids of tropane.

The free radicals in accordance with this invention are intermediates for use in pharmaceutics (derivatives of tropane), in biology for labeling by the spin of certain molecules or macromolecules as in French Pat. No. 1,501,115, in chemistry as initiators of radical reactions, as collectors of free radicals, as polymerization inhibitors, as antioxidants, in physics as in U.S. Pat. No. 3,249,856 and in the solid state as purely organic samples exhibiting particular magnetic properties which were hitherto known only in metallic derivatives (paramagnetism, diamagnetism, antiferromagnetism and so forth).

The free radicals in accordance with the invention are characterized in that they are constituted by nitrogenous bicyclic compounds having the general formula:

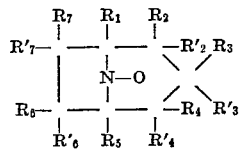

in which $R_1$, $R_2$, $R'_2$, $R_4$, $R'_4$, $R_5$, $R_6$, $R'_6$, $R_7$ and $R'_7$ are hydrogen atoms or organic radicals and $R_3$ and $R'_3$ are hydrogen atoms or the groups OH, $NH_2$, N—OH, N—$NH_2$—COOH—COOR, $CONH_2$, etc.

The stability of these radicals can be attributed either to the presence of two quaternary carbons which form a direct link with the nitrogen atom if $R_1$ and $R_5$ are radicals other than hydrogen or to the bicyclic system itself if $R_1$ and $R_5$ are hydrogen atoms.

The preparation of a few free radicals corresponding to the foregoing definition will now be described by way of example without any limitation being implied.

In a first example, there was prepared aza-8 bicyclo (3,2,1) octanone-3 dimethyl-1,5 oxyl-8 or dimethyl-1,5 nortropinone nitroxide having the formula:

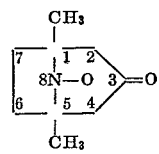

The synthesis of this compound can be represented diagrammatically by the following reactions:

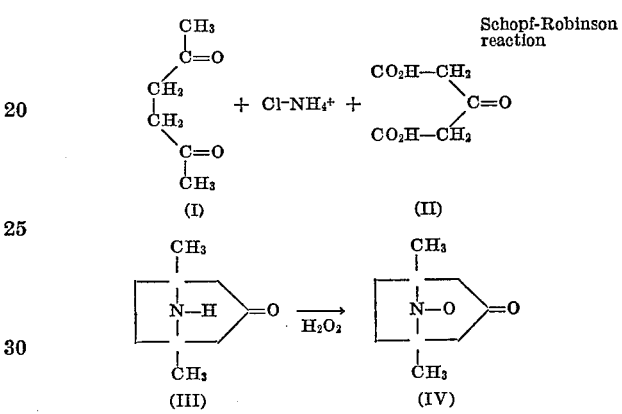

In an Erlenmeyer flask, there were placed 7 g. of hexanedione-2,5 (0.6 M of compound I) to which was added a solution of 17 g. of dicarboxylic acid acetone (0.12 M of compound II) in 100 ml. of water.

The mixture was neutralized in ice by potassium. There was then poured into said mixture a solution of 10 g. of ammonium chloride and 20 g. of sodium acetate in 100 ml. of water. The pH value of the mixture was brought to 9 by potassium in pellet form. The mixture was stirred and left at ambient temperature for a period of 3 days.

The brown solution was subjected to vigorous washing in an acid medium ($H_2SO_4$) with methylene chloride.

The aqueous phase was passed into a basic medium (KOH), saturated with potassium carbonate and extracted by ethyl ether in continuous operation for a period of 48 hours.

After drying of the solvent on sodium sulphate and vacuum evaporation, a brown oil was obtained and filtered through a column of basic "Woelm" alumina having activity V, elution being carried out with petroleum ether. Approximately 2 g. of a clear oil were obtained.

Said oil was then passed through a chromatographic column containing 150 g. of basic "Woelm" alumina having activity V. Elution was carried out as follows:

4 fractions of 150 ml. of petroleum ether
4 fractions of 150 ml. of petroleum ether containing 2% ethyl ether
4 fractions of 150 ml. of petroleum ether containing 5% ethyl ether
4 fractions of 150 ml. of petroleum ether containing 10% ethyl ether
4 fractions of 150 ml. of petroleum ether containing 20% ethyl ether The amine began to pass in the last fractions at 5% and remained up to 20%.

There were obtained approximately 1.5 g. of yellowish crystals (compound III) which were recrystallized in distilled pentane.

The amine was obtained in the form of white flakes with a yield of 20% with respect to the starting diketone.

The melting point of the amine was 44° C. and the infrared spectrum was characterized by a C=O band at 1720 cm.$^{-1}$ which showed that the amine was in hydrated form

Microanalysis of picrate: $C_{15}H_{18}O_8N_4$ (molecular weight: 382.33)—Calcd. (percent): C, 47.18; H, 4.75; O, 33.48; N, 14.66. Tr. (percent): C, 47.14; H, 4.89; O, 33.59; N, 14.53.

500 mg. of amine (compound III) were dissolved in 4 cc. of water. There were added 1 ml. of hydrogen peroxide having a strength of 110 volumes and 50 mg. of phosphotungstic acid. Stirring of the mixture was continued for a period of aproximately 2 hrs. 30 mins.

The orange-colored solution was saturated with sodium chloride. The radical was extracted with methylene chloride and washed three times with 100 cc. of $H_2SO_4N$. The solvent was dried on sodium sulphate and evaporated under vacuum.

There were thus obtained 300 mg. of a red oil which was purified by chromatography on 30 g. of neutral "Woelm" alumina having activity III.

By recrystallization in petroleum ether cooled with solid carbon dioxide (Dry Ice), there were obtained approximately 200 mg. of crystallized radical in the form of orange needles (compound IV), which represented a yield of the order of 25% with respect to the starting amine.

The radical had a melting point of 44.5° C. and an infrared spectrum which was characterized by a C=O band at 1720 cm.$^{-1}$.

Microanalysis in respect of $C_9H_{14}O_2N$ (molecular weight of 168.21)—Calcd. (percent): C, 64.26; H, 8.40; O, 19.02; N, 8.32. Tr. (percent): C, 64.22; H, 8.40; O, 18.98; N, 8.36.

In a second example, there was prepared aza-8 bicyclo (3,2,1) octanone-3 oxyl-8 or nortropinone nitroxide having the formula:

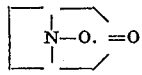

The preparation of this compound can be represented schematically by the following reactions:

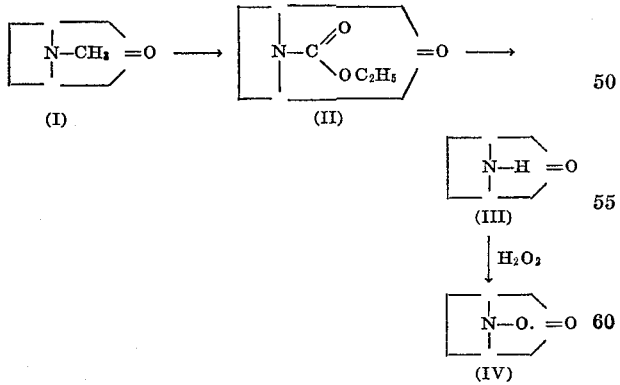

A quantity of 1.39 g. of tropinone (0.01 M of compound I) dissolved in 10 ml. of methylene chloride was placed in an Erlenmeyer flask. There were added 1.6 ml. of ethylchloroformate and the mixture was stirred for a period of 24 hours at ambient temperature.

A quantity of 20 ml. of ethyl ether was added to the solution. There was then formed a white precipitate of tropinone hydrochlorate which was separated on a Buchner funnel. After washing the filtrate with 20 ml. of 1 N HCl, the nortropinone N-ethylformate was extracted by ethyl ether, dried on sodium sulphate and evaporated under vacuum.

A yellowish liquid, namely crude nortropinone N-ethylformate (compound II) was obtained with a yield of the order of 80% with respect to the starting tropinone.

1 g. of nortropinone N-ethylformate was dissolved in 4 cc. of diethylene glycol and 20 ml. of a 2 N sodium hydroxide solution. The mixture was maintained in nitrogen at 75° C. for a period of 6 hours with vigorous stirring.

After cooling and in ice, the mixture was passed into an acid medium ($H_2SO_4N$). Evolution of gas then took place for approximately one-half hour. The solution was washed with ether.

The aqueous phase was neutralized in the ice by potassium in pellet form, then saturated with potassium carbonate and continuously extracted by ethyl ether for a period of 48 hours. After drying on sodium sulphate and vacuum evaporation, a brown oily liquid was obtained and subjected to chromatographic processing through a column of basic "Woelm" alumina having activity V. Elution was carried out as follows:

2 fractions with pentane
2 fractions with pentane containing 2% ethyl ether
2 fractions with pentane containing 5% ethyl ether
2 fractions with pentane containing 10% ethyl ether
2 fractions with pentane containing 25% ethyl ether
2 fractions with pentane containing 50% ethyl ether
2 fractions with pentane containing 100% ethyl ether In 2 fractions of 50% methylene chloride, the entire quantity of amine then passed.

After evaporation of the solvent, 200 mg. of white crystals (compound III) were obtained and this represented a yield of 30% with respect to the nortropinone N-ethylformate.

The melting point of the picrate was 190° C. after recrystallization in ethanol.

The infrared spectrum of this compound was characterized by an N—H band at 3350 cm.$^{-1}$ and by a C=O band at 1715 cm.$^{-1}$ Microanalysis of the picrate in respect of $C_{13}H_{14}O_8N_4$ (molecular weight: 354.27)—Calc. (percent) C, 44.07; H, 3.98; N, 15.82. Tr. (percent): C, 43.93; H, 4.06; N, 15.49.

500 mg. of amine were dissolved in 4 cc. of water. There was then added 1 ml. of hydrogen peroxide having a strength of 110 volumes and 40 mg. of phosphotungstic acid. Stirring of the mixture was carried out for a period of approximately 2 hours.

The pink solution was saturated with sodium chloride. The radical was extracted by methylene chloride. After drying on sodium sulphate and vacuum evaporation, approximately 300 mg. of crude radical product were obtained in the form of a yellow powder.

By recrystallization in benzene, there were obtained approximately 150 mg. of radical which was recrystallized in the form of small yellow plates (compound IV), namely a yield of the order of 20% with respect to the starting amine.

The melting point of the radical was 124° C. Its infrared spectrum was characterized by a C=O band at 1720 cm.$^{-1}$.

There were also prepared dimethyl-1,5 nortropine and nor-pseudo tropine nitroxide as well as nortropine and nor-pseudo tropine nitroxide (in the formula given above, $R'_3$ is a hydrogen atom and $R_3$ is the hydroxyl group).

These compounds correspond to the alcohol nitroxides derived from the ketone nitroxides which have previously been described.

The amino alcohols are obtained from the corresponding amino ketones by the usual methods of reduction of ketones in alcohols such as, for example, the method described by House and Muller in "Journal of Organic Chemistry" p. 2047 (1963).

The nitroxide radicals are obtained from the amino alcohols as previously described in connection with the preparation of compounds IV.

Starting from the ketone function or from the alcohol function as the case may be, there is obtained by way of example:

the carbide $R'_3 = R_3 = H$
the oxime $R'_3, R_3\cdot = N—OH$
hydrazone $R'_3, R_3 = N—NH_2$ and the biradical

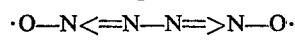

by condensation of the monoradical with hydrogen in diethylene glycol as was described in French Pat. No. 1,424,505 granted to the present application on Nov. 26, 1964;
the organic acid esters $R'_3 = H$,

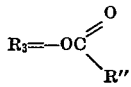

and the biradicals or polyradicals

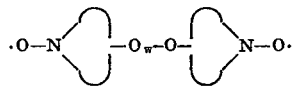

by condensation of the monoradical with the chlorides of diacids or of polyacids;
the amino acids $R'_3 = NH_2$, $R_3 = COOH$ and their biradical metallic complexes as was described in French Pat. No. 1,501,917 granted to the present applicant on Sept. 28, 1966.

It is also possible to obtain compounds in which the protons of the compounds described earlier are replaced by deuterons. These deuterated compounds consequently exhibit lines of smaller width in electron paramagnetic resonance. In order to prepare said compounds, the starting hexanedione-2,5 and dicarboxylic acid acetone are subjected to an isotopic exchange in heavy water. The Schopf-Robinson synthesis is then carried out in heavy water.

What is claimed is:
1. A nitroxide stable free radical having the formula:

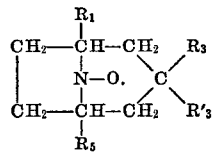

in which $R_1$ and $R_5$ are selected from the group consisting of hydrogen atoms and methyl radicals and $R_3$ and $R'_3$ are selected from the group consisting of $NH_2$, —COOH, the ketone group —C=O and the alcohol group

2. A stable free radical in accordance with claim 1 and selected from the group consisting of nortropinone nitroxide, dimethyl-1,5 nortropinone nitroxide, dimethyl-1,5 nortropine nitroxide, dimethyl-1,5 nor-pseudo tropine nitroxide, nortropinone nitroxide, nor-pseudo tropine nitroxide.

References Cited
UNITED STATES PATENTS 3,249,856   12/1963   Lemaire et al. _____ 324—5

FOREIGN PATENTS 1,501,115   10/1967   France _____ 324—5

ALAN L. ROTMAN, Primary Examiner

U.S. Cl. X.R.

148—101; 260—45.8 N; 424—265